March 23, 1965 D. G. BOOTH ET AL 3,174,410
RELIEF VALVE DEVICES FOR HYDRAULIC POWER SYSTEMS
Filed May 21, 1962
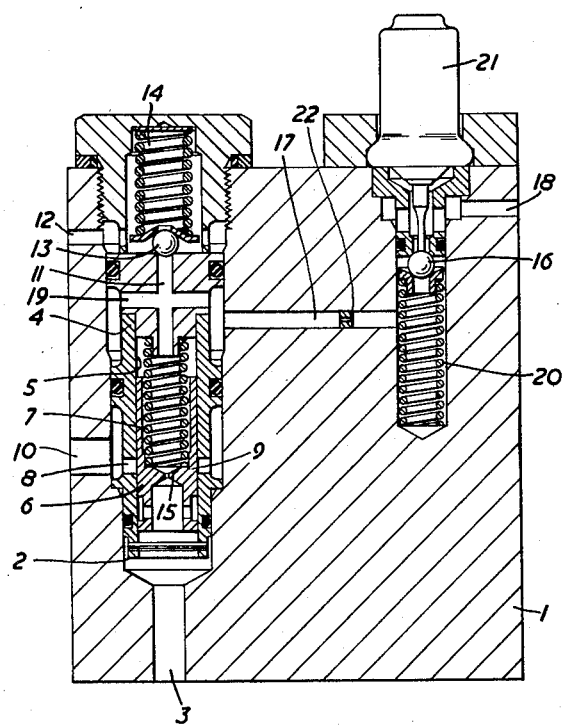

United States Patent Office 3,174,410
Patented Mar. 23, 1965

3,174,410
RELIEF VALVE DEVICES FOR HYDRAULIC POWER SYSTEMS
Douglas G. Booth, Highworth, and Frank D. Taylor, Swindon, England, assignors to The Plessey Company Limited, Ilford, Essex, England, a company of Great Britain
Filed May 21, 1962, Ser. No. 198,696
6 Claims. (Cl. 91—419)

This invention relates to hydraulic power systems in which hydraulic pressure is produced by a pump and is re-circulated after operating a hydraulic motor and/or passing through valve devices. In such systems a condition may arise in which, due to the effect of loaded relief valves, restricted passages etc., more particularly in consequence of a continuous high-pressure discharge through a relief valve, the working temperature of the liquid is liable to rise and may if unchecked reach a dangerous level. It is an object of the present invention to provide improved means for safe-guarding the system against excessive temperature rise.

According to the present invention a pressure relief valve which is controlled by a pressure-responsive main pilot valve so as to normally maintain a predetermined system pressure, is combined with a second pilot valve connected to the relief valve in parallel to the main pilot valve and controlled by a heat sensitive member, so as to cause, when the temperature rises above a predetermined level, the relief valve to open at a lower pressure than that for which the main pilot valve is set, there being means provided for causing a reduced system pressure to be maintained while the second pilot valve is open.

An embodiment of the invention is illustrated in the accompanying drawings, which is a sectional elevation showing the valve arrangement.

The device as illustrated comprises a valve block 1 formed with a relief-valve chamber 2 of which one end communicates with the pressurised system through a passage 3. Arranged in the chamber 2 is a relief-valve housing 4 having a cylindrical bore 5 in which a relief valve spool 6, perforated by a restricted or metering aperture 15, is slidable, a spring 7 being provided to urge the spool towards the closed position. The relief-valve housing is formed with a port 8 controlled by a land 9 of the valve spool 6 and leading to a reservoir or outlet connection 10 so that, when the valve spool 6 is moved by a pressure difference across the metering aperture 15 against the action of spring 7, land 9 clears the port 8 so as to permit pressure liquid from line 3 to return through passage 10 to the reservoir. The opposite end of the bore 5 is connected with the reservoir through a bore 11 and passage 12, but the end of the bore 11 is normally closed by a ball 13 adjustably loaded by a spring 14 and constituting a main relief pilot valve. The provision of the metering aperture 15 in the valve spool 6, connecting the two ends of the bore 5, ensures that normally, when the valve 13 is closed, the bore 11 and thus the bore 5 at the back of the valve spool 6, is under pressure of the supply connection 3, and the valve spool 6 is in its illustrated position, in which the land 9 cuts off communication between the line 3 and the reservoir outlet 10. As so far described the device operates in a well-known manner. When the pressure exceeds the value at which the pilot valve has been set, the pilot valve 13 opens, causing the pressure in bore 11 to drop, whereupon the pressure difference between passage 3 and bore 11 causes valve spool 6 to move to a position permitting excess fluid to return to the reservoir through passage 10 until the predetermined pressure is restored. In the arrangement according to the present invention a second pilot valve 16 is arranged in a branch passage 17, which communicates with the bore 11 by a cross-bore 19 and likewise leads back to the reservoir through passage 18. This second pilot valve 16 is normally held on its seat by the combined actions of the pressure in passage 17 and of a light spring 20, but is adapted to be raised from its seat against this action by a temperature-sensitive capsule 21 which is immersed in the working fluid, when the temperature of the working fluid increases above a predetermined limit. The opening of the valve 16, which takes place independently of the pressure in the bore 11 relieves the pressure in bore 11 similarly to the opening of valve 13. According to the amount of opening of the valve 16 and/or any metering aperture which may be provided in the passage 17, 18 as diagrammatically indicated at 22, the pressure in bore 11 will therefore fall to a value dependent upon the relative flow resistance in aperture 15 and passage 17, 18, thus causing the valve 6 to allow the escape of liquid from passage 3 to passage 10 and thus reduce correspondingly the pressure in passage 3 and the system pressure, thereby eliminating or substantially reducing the generation of heat in the circulating liquid. When the temperature of the liquid has, as a consequence, dropped again below the safe limit, the temperature-sensitive capsule 21 allows the valve 16 to close again, thus restoring the normal function of the pressure responsive-relief valve.

The invention may be used with advantage in hydraulic systems provided in so-called tractors and in other installations in which permanent observation of a visible temperature indication cannot be relied upon.

While one embodiment of the invention has been described by way of example, various details of this embodiment may be modified without exceeding the scope of the invention. Thus the means causing a reduced system pressure to be retained on operation of the second pilot valve may comprise a loaded non-return valve instead of a restriction in series with said second pilot valve.

What we claim is:

1. A relief valve device comprising a pressure-relief valve which is controlled by a pressure-responsive main pilot valve so as to normally maintain a predetermined system pressure, a second pilot valve connected to the relief valve in parallel to the main pilot valve, and a heat-sensitive member controlling operation of the second pilot valve so as to cause, when the temperature rises above a predetermined level, the relief valve to open at a lower pressure than that for which the main pilot valve is set, and means including a flow-restriction means in series with the second pilot valve, for causing a reduced system pressure to be maintained when the second pilot valve is open.

2. A relief valve device as claimed in claim 1, wherein the means for causing the reduced pressure to be maintained includes means producing a pressure drop in series with the second pilot valve.

3. A hydraulic power system including a source of hydraulic pressure, said system having an outlet leading to a low-pressure port, an outlet valve movable from a closed to an open position to control said outlet, spring means urging said valve to its closed position, a control chamber, a piston element operatively connected with the valve and acted upon by pressure from said source against the pressure in the control chamber to urge the valve to its open position, a restricted communication between the source and the control chamber, a first control passage connecting the control chamber to the low pressure point, a pressure-responsive first pilot valve controlling the first control passage, a second control passage also leading to the low-pressure point, a temperature-responsive pilot valve in said second control passage, and means producing a pressure drop arranged in said second control passage in series with the temperature-responsive pilot valve, said temperature responsive pilot valve being such as to cause, when the temperature rises above a predetermined level, the outlet valve to open at a lower pressure than that for which the first pilot valve is set.

4. A hydraulic power system as claimed in claim 3 in which said means for producing a pressure drop comprises a restrictor.

5. A relief device including a pressure relief valve movable between a closed and an open position, spring means urging the pressure relief valve to its closed position, a control chamber, a restricted communication between the high pressure side of the relief valve and the control chamber, a piston operatively connected with the pressure relief valve and acted upon by the pressure at the high pressure side of the relief valve against the control chamber pressure to urge the relief valve to its open position, a first control passage connecting the control chamber with a point of low pressure, a pressure responsive first pilot valve controlling the first control passage, a second control passage connecting the control chamber with the point of low pressure, a temperature responsive second pilot valve controlling the second control passage, and pressure drop producing means in said second control passage in series with the second pilot valve, said second pilot valve being such as to cause, when open, the pressure relief valve to open at a lower pressure than that for which the first pilot valve is set.

6. In a hydraulic power system including a source of hydraulic pressure and means to be actuated by said hydraulic pressure, the combination comprising a pressure-relief valve having a control chamber having a first outlet including a pressure-responsive pilot valve normally maintaining a predetermined pressure in said chamber, and a second outlet including a temperature-responsive pilot valve and a restrictor in series with the temperature-responsive pilot valve, and operating means for the relief valve, responsive to the pressure in the control chamber.

References Cited by the Examiner
UNITED STATES PATENTS

| | | | |
|---|---|---|---|
| 2,103,984 | 12/37 | Indge. | |
| 2,287,433 | 6/42 | Klafstad | 137—468 |
| 2,318,851 | 5/43 | Griffith | 60—97 X |
| 2,461,982 | 2/49 | Horne | 137—491 XR |
| 2,498,542 | 2/50 | Gardiner | 137—491 |
| 2,635,636 | 4/53 | Carson. | |
| 2,661,017 | 12/53 | Geiger | 137—491 |
| 2,688,229 | 9/54 | Lee | 60—39.28 |
| 2,747,802 | 5/56 | Kmiecik | 236—92 |
| 2,868,460 | 1/59 | Hansen | 236—92 |

JULIUS E. WEST, *Primary Examiner.*

MARTIN SCHWADRON, EDGAR W. GEOGHEGAN,
*Examiners.*